US006725214B2

(12) United States Patent
Garcia-Chiesa

(10) Patent No.: US 6,725,214 B2
(45) Date of Patent: Apr. 20, 2004

(54) APPARATUS AND METHOD TO SUPPORT MANAGEMENT OF UNIFORM RESOURCE LOCATORS AND/OR CONTENTS OF DATABASE SERVERS

(75) Inventor: Jorge Garcia-Chiesa, Windsor (GB)

(73) Assignee: DOTNSF, Wilmington, DE (US)

( * ) Notice: Subject to any disclaimer, the term of this patent is extended or adjusted under 35 U.S.C. 154(b) by 352 days.

(21) Appl. No.: 09/764,968

(22) Filed: Jan. 16, 2001

(65) Prior Publication Data

US 2002/0099723 A1 Jul. 25, 2002

Related U.S. Application Data

(60) Provisional application No. 60/176,233, filed on Jan. 14, 2000.

(51) Int. Cl.$^7$ .................................... G06F 17/30
(52) U.S. Cl. .................................... 707/3; 707/7
(58) Field of Search ............................ 707/3, 1, 100, 707/101, 7; 709/224; 715/513

(56) References Cited

U.S. PATENT DOCUMENTS

| | | | | |
|---|---|---|---|---|
| 6,271,840 B1 * | 8/2001 | Finseth et al. | ............ | 715/513 |
| 6,286,006 B1 * | 9/2001 | Bharat et al. | ............ | 707/100 |
| 6,401,118 B1 * | 6/2002 | Thomas | ............ | 709/224 |
| 6,460,060 B1 * | 10/2002 | Maddalozzo et al. | ....... | 715/513 |

* cited by examiner

*Primary Examiner*—Sanjiv Shah
(74) *Attorney, Agent, or Firm*—Alexander B. Ching

(57) ABSTRACT

Methods and Systems for finding a Uniform Resource Locator (URL) that points to a most updated authoritative source of information contained in database systems, including crawling websites to determine likely publicly available records and processing the likely publicly available records to determine a unique list of URLs each of which point to information content of crawled web sites that are likely to be the most updated authoritative source of the information content.

28 Claims, 2 Drawing Sheets

APPARATUS AND METHOD TO SUPPORT MANAGEMENT OF UNIFORM RESOURCE LOCATORS AND/OR CONTENTS OF DATABASE SERVERS

PRIORITY

This application claims priority under 35 U.S.C. § 120 from U.S. application Ser. No. 60/176,233, filed on Jan. 14, 2000.

BACKGROUND OF THE INVENTION

1. Technical Field

This invention generally relates to the usability of Internet/intranet sites by users of web-portals and/or search-engines. The inter-relations among users, sites, search engines and our inventions are summarised in FIG. 1 below 2. Background Art Software products such as Lotus Notes and Lotus Domino (both produced by Lotus Development Inc., a wholly-owned subsidiary of IBM Inc) store information in structured or unstructured records, also called "notes" within files. With regards to Lotus products in particular, the files commonly have the extension ".nsf" which stands for Notes Storage Facility. Whether or not Internet search engines are able to locate information housed within such ".nsf" files depends upon how a particular Lotus system is configured. For instance, the default configuration of the Lotus Domino product makes ".nsf" files completely 100% invisible to web search engine crawlers. As a result, users of search engines will not be able to obtain any information they might be searching for within ".nsf" files housed on a Lotus Domino system with a default configuration.

In an attempt to make ".nsf" files visible to Internet search engines, many Lotus site owners activate "friendly URLs formats configuration options" found in the current Lotus products. However, the activation of these options typically causes the publishing of infinite loops or redundant and duplicate Uniform Resource Locators (URLs) for ".nsf" files. Mixed configurations of the Lotus Domino product normally produces a wide in between degradee of similar dissatisfactory results including the involuntary publishing by site owners of copyrighted documentation and material included in the standard installation of the Lotus Domino software package. Internet sites (based on Lotus Domino) operators or owners do not normally have legal rights to re-publish this, nor they are "authoritative sites" for that documentation.

Thus, Internet users who are searching for files over the Internet via search engines can become frustrated by not being able to find most relevant documents stored in .NSF containers. This is due to the mismatch between Search Engine Crawlers and files created by Lotus Domino (.NSF files). And when a document created by Lotus Domino (a .NSF file) does turn up amongst search engine results, Internet users are further frustrated when the direct link to that document is "unframed" (meaning that it lacks useful contextual information required by navigational tools, such as container and/or site context).

Lotus Domino is estimated at the time of filing of this application to be in use by circa 50 million users worldwide, who use it to create documents—content—a significant piece of which is intended to be made available over the internet via the usage of the HTTP protocol—popularly known as the WWW. Thus, there is a need to provide better management of ".nsf" files for use on the Internet to facilitate location of relevant information, as well as to properly manage secured and copyrighted information.

SUMMARY OF THE INVENTION

The present invention discloses an apparatus and method to support authoritative registration, location, de-duplication, security-clearance, sanitization, submission, indexation, and robotic/human reference-contextualized-retrieval of Uniform Resource Locators (URL's) and/or contents of database servers. The method includes the provision of a WorldWide publicly available "Library" (technical term to define a listed set of databases) that lists (upon requests or automatically) which is/are the authoritative site/s for each registered ReplicaId. The method further includes a native crawler that finds the 100% complete lists of URLs by asking NATIVELY (with a Lotus Domino/Notes "NRPC" API call) to the system the exhaustive list of databases and records within each database.

The native crawler creates a "minimal" URL with just these 2 pieces of information. For each potential UTRL, using native Lotus Domino/Notes, a verification is made to determine the likelihood that such document is "publicly available." Then the actual document accessibility is confirmed and contents of that URL are retrieved by checking each of them with a NON-native notes standard based http access (via a browser system call to port 80). Further, the methods the present invention generate lists of unique URLs that are marked each of them as static, thus the engines do not need to follow ANY non-static link. Plus, the list that follows is deduplicated, optimized and sanitized. The methods of the present invention use standard internet domain naming resolution (DNS) to virtualizes each ReplicaID as a subsite of the general virtual site, which in turn we build with a combination of A,CNAME and NS records that include "wildcarded (*)" elements.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawing, where like designations denote like elements, and.

MODE(S) FOR CARRYING OUT THE INVENTION

Figure 1:
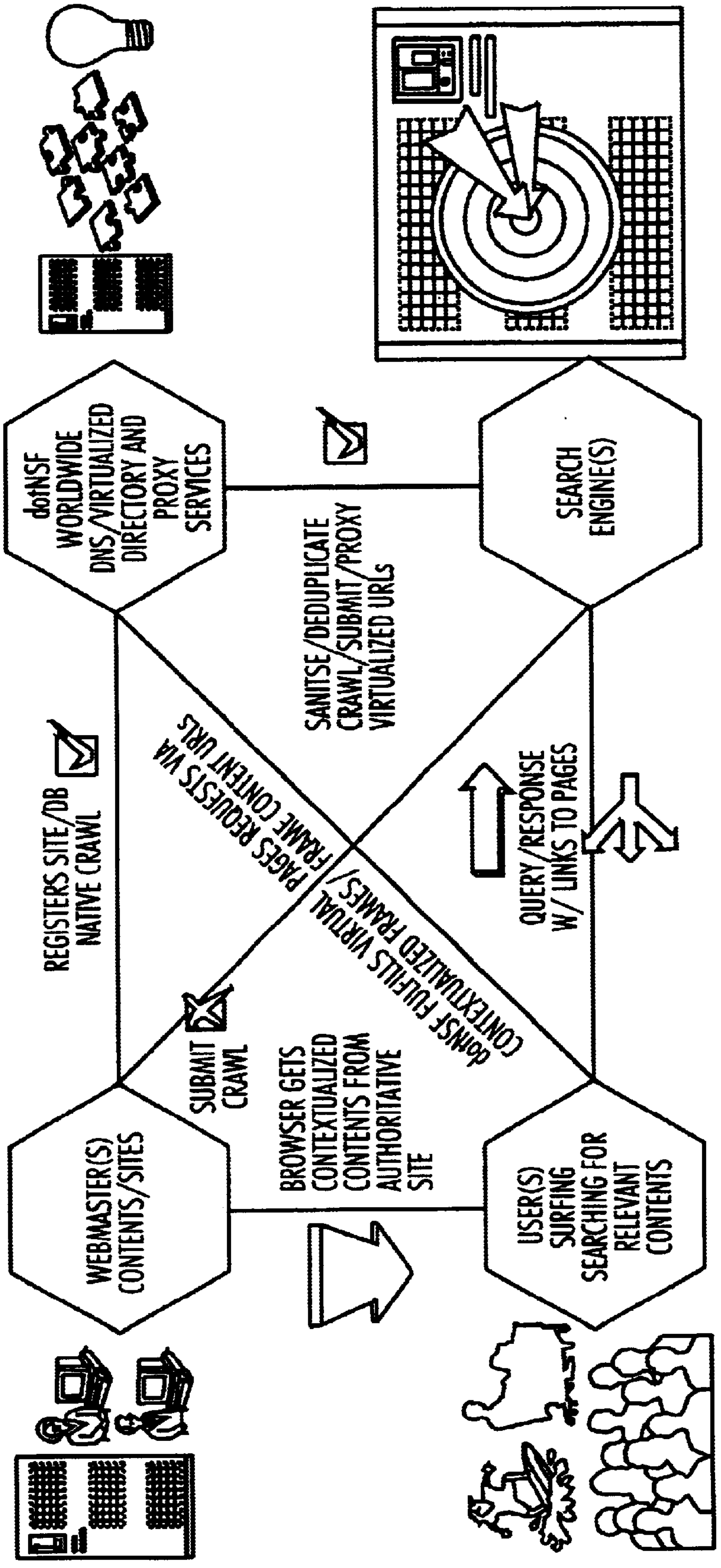
FIG. 1 is a view of the interactions between the database server, the search engines, the worldwide public "Library" and the web browsing Internet user.
Figure 2:
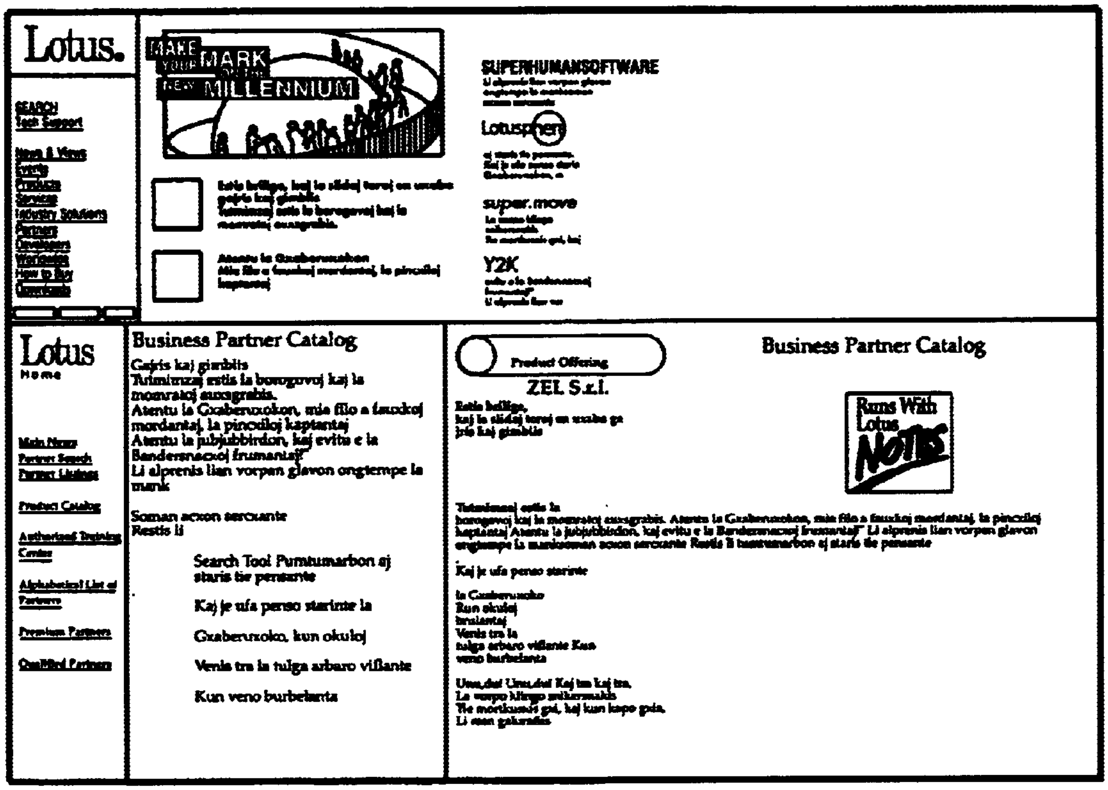
FIG. 2 is a website having a worldwide directory providing virtualized URLs.

The present invention discloses a combination of technologies and procedures that bridges the gaps among 1) popular World Wide Web (hereinafter WWW) Search Engines Crawlers automated agents—also called robots—programs and procedures (hereinafter Crawlers) looking for link-based-crawlable WorldWideWeb (a.k.a. WWW) content at sites worldwide [it's estimated that the number of active relevant crawlers on a world wide basis is in the order of some thousand robots/crawlers actively searching through the internet for new content to index], 2) the output of the emitter module of the HTTP stack of a particular vendor implementation of a Web Server called Lotus Domino, sometimes improperly referred as Lotus Notes Server (old terminology) [Lotus and Lotus Notes are registered trademarks and Notes and Domino are trademarks of Lotus Development Corporation; Lotus Domino is estimated at the time of filing of this application to be in use by circa 60+million users worldwide, who use it to create documents—content—a significant piece of which is intended to be made available over the internet via the usage of the HTTP protocol—popularly known as the WWW. Contents stored by Domino servers are normally stored in files that have the extension ".NSF"], and 3) Internet users frustrated by a) normally not being able to find most relevant documents stored in .NSF containers due to the mismatch between 1 and 2, and b) also frustrated because when they do find some useful document the direct link to it is normally "unframed" and thus lacks the container, and site context and navigational tools, i.e. it points to nowhere useful contextually.

WorldWide Directory of Authoritative Source Site/s for a given .NSF

Lotus Notes and Lotus Domino are software products that store information in records "notes" within files commonly having the extension nsf (that stands for Notes Storage Facility). A characteristic of Lotus Notes/Domino is that each database has a unique system generated number called ReplicaId. Databases having different contents have different ReplicaIds and conversely, whenever 2 or more instances/copies of a database are present in multiple locations, the system can synchronize them through a technique that Lotus calls "replication". Within each unique Database-ReplicaId, records (notes) are assigned or have different properties, among which a unique number (UNID=UNiversal ID) that identifies each document uniquely within ANY of the instances (replicas) of the database. Thus, a database can be uniquely identified on a worldwide basis by its ReplicaID, and each of its documents can be identified also uniquely within that replica Id by the document UNID. In other words, to access any document stored in an .NSF file somewhere in the world the minimum information needed are 3 items: 2 that are mechanically generated (Database ReplicaId and Document UNID) and the third one is at least one of the names of one of the sites that contains somewhere within the site that database.

Thus, the methods of the present invention make a WorldWide publicly available "Library" (technical term to define a listed set of databases) that lists (upon requests or automatically) which is/are the authoritative site/s for each registered ReplicaId.

"Native Crawler"

Traditional search-engines-crawler algorithms follow recursively all hypertextual links from a given page, trying to eliminate duplicates, and generating an exhaustive brute-force list of all URLs (universal resource locators) that a site contains. That unique list is fed within the search-engines from the crawler modules to the indexer modules. The indexer-modules visit over time each of the pages (requesting them one by one), stripping out the non indexable pieces (typically all formatting sequences).

Thus, the methods of the present invention further include a native crawler that finds the 100% complete lists of URLs by asking NATIVELY (with a Notes API call) to the system the exhaustive list of databases and records within each database. The native crawler creates a "minimal" URL with just these 2 pieces of information. For each potential URL, using native Lotus Notes, a verification is made that the document is "publicly available." Then the actual document accessibility is confirmed and contents of that URL are retrieved by checking each of them with a NON-native notes http access (via a browser system call). An algorithm may be used to process likely publicly available documents to determine the most likely authoritative source, for example, checking the copyright of the content, etc.

"Comprehensive but deduplicated Lists of URLs"

The lists of URLs that we generate are furthermore deduplicated by NOT listing contents that while present and available at a site have another site registered as [more] authoritative owner. Typical example of this are the thousand of HELP and documentation pages that a system installed with default configuration would immediately publish by mistake. By normalizing URLs into just ReplicaId/WNID we eliminate the need for listing the actual site in the unique lists submitted or made available to search engines. Actually, in order to provide the deduplication and contextualisation service, we list our master WW (worldwide) directory as the virtual site for those databases.

"SubVirtualDomain"

The methods of the present invention use standard internet domain naming resolution (DNS) to virtualizes each ReplicaID as a subsite of the general virtual site, which in turn we build with a combination of A,CNAME and NS records that include "wildcarded (*)" elements.

"Context Handling"

Traditionally, URLs automatically generated by Notes/Domino contain information that not only identifies the content but also the navigational path used to access that document, for example a particular document in a brainstorming database will have at least one different URL for each possible order of visualization of the documents, i.e. by date, author, subject, category, etc.

This means that—sort of by design—Lotus Notes/Domino generates multiple URLs for each document. On top of this complexity, when the generated pages contain navigational aids (next page/previous page, expand, collapse, etc) it's extremely easy/likely that a search engine trying to follow all possible links will be driven into a very long(finite, but huge) loop.

"Freeze"

While WWW Search-Engines normally expect the sites to be primarily "static", Domino sites are inherently dynamic. Metaphorically speaking, search engines are trying to take a picture/snapshot of a subject that is too dynamic for them (the subject moves too much for them). Notes/Domino original architecture—by design—marks this characteristic to search engines by mean of the usage of the so-called ISINDEX syntactical symbol in the URL: a question mark, indicating a transaction. Most web search engines and crawlers simply SKIP any URL containing a "?". As a result of this, Lotus Notes/Domino sites—as configured by default—are completely "stealth/invisible" to search engines. In a recent release of the Lotus software—R5—a feature was added to replace ALL instances of the "?" symbol with another symbol"!". The result of this is that now search engines DO NOT recognize ANY of the automatically generated URLs as dynamic, and they are even more prone to enter loops.

Thus, the methods the present invention generates lists of unique URLs that are marked each of them as static and that each of them, thus the engines do not need to follow ANY non-static link. Plus, the list that follows is deduplicated, optimized and sanitized.

"Sanitisation of content"

Pages contain a lot of non-indexable information, that—in the context of submitting 100% of the valid pages anyhow—can include any other link to any other page. Thus, all the engines need to index a page is the bare text of that page. We provide this filtering. Some pages are designed with META information to be "doors" to other information that while not present in the page can be accessed via links in that page. For the same reasons, we remove these references when sanitizing information for each page. In other words, each page can be found only by its own merits.

"Resolution of ReplicaId into actual content and/or reference to content"

When a request arrives to our "virtual/proxy" site for a request for a database with or without a record indication, we determine in what site/s the database is present, and reply to the client with a combination of proxied/sanitised content and/or redirection statements. Filtering/banning/etc rules can be applied at this step. Typical processing at this step includes the determination of the most adequate content based on the cumulative knowledge that we have about the requester (via a combination of fuzzy logic rules [i.e. address, agent, cookies, spider-spotting techniques, etc] we determine the likelihood of the request coming from a human being or from an internet robot (like the search engines)).

"Avoidance of 404s due to database or directories moves or renaming"

Since we do not use physical file names and paths, web servers can rearrange their directory structures as they wish, creating or renaming directory structures and placement of databases at will. The sanitized URLs using replica-ids will always work as intended despite moves.

Re-Contextualisation of Content

We have made all possible efforts to de-contextualise individual documents, a key example being the usage of the single character 0 within/0/ to fill Lotus Notes/Domino need for a "view" (ordering of documents). Once a user finds a document in any search engine [or via an equivalent sanitized link constructed with our techniques], if the user is deemed to be a human, will be replied by a "framed" content (one or more nested frameset/s). While the actual contents of each frame/set are customizable in the different commercial/products offerings derived from this technologies, we foresee as important the inclusion of a top frame with navigational, reference, etc tools for the virtual site, then a frame with the homepage of the actual site hosting the database, then a subframe with the contexts of the database, then finally what the user found in the search engine (the "document"). This has the advantage for the user that with just one click he/she moves from the link (in the search engine results page) to the actual document with all the relevant reference information that he/she would have had o navigate from the home page of the site to arrive to that document. This has also benefits for the site and content owners who see their storefronts processes being activated for branding, framing, etc.

Switching of Client Software

Since many users can also have been granted native notes access to the content that they had found using an http browser, and may want to continue operating using the native notes client, we also provide the novelty of a one-click switch of context between the document as visualized in the browser and the SAME document in the same replica-id database at the same or at a different location (i.e. anywhere in the user's intranet, extranet or internet). The NOVELY techniques used are similar in concept, and the implementation is done via the fulfilment to the browser of dynamically generated MIME code of type "application/ndl".

The present invention includes the provision of a World Wide unique directory—available for public usage via the Internet—that lists the most authoritatively known site for each known database. Users and public can consult this site, and webmaster can manually or digitally request modifications and additions to this catalog. These requests are electronically signed for non-repudiation purposes using the PKI (public key infrastructure) contained within Lotus Notes/Domino. Wherever regulations allow, Internet traffic of key modifications to the directory is also encrypted for privacy using similar built-in technologies.

The technologies described in this patent application, allow the comprehensive analysis of a site contents, the determination of which pieces of each site (databases and documents contained within databases) are intended to be made available to crawlers from a security point of view (on the basis of the analysis of the Access Control Lists—ACLs and Reader Fields, special fields that control who can see a document); the effective reconstruction of a unique deduplicated and optimized list of all possible URLs referencing this content—by reverse engineering of the syntax of the possible emitted URLs (universal resource locators); the transformation of these URLs by parsing/analysis of their syntax and elimination—or substitution with placeholders—of non relevant and/or non key information that would render different possible syntaxes of URL to point to the same document—effectively creating as many "duplicate" or redundant pointers to a particular document as possible combinations of "paths" and parameters into that document are technically feasible. Further more the techniques include the elimination of possible crawling loops that due to minor differences in the emitted URLs format could otherwise be undetected by crawlers not specifically aware of the non-materiality of these subtle syntactic differences. Another key element of the technologies is the substitution of physical paths within the site (i.e. www.wherever.com/whateverpath.nsf) with a "logical" path into the database container as identified uniquely on a worldwide basis by the database replication-id (a.k.a. ReplicaId). This feature radically eliminates most of the so called "404"="Not Found" error result codes that users get when a site webmaster re-organizes his/her site by moving databases around the physical file system. The URLs resulting from the transformations applied by our inventions are automatically recognized by the Lotus Domino system as unique logical names pointing uniquely into content that can be anywhere within the site. In a similar manner, the inventions replace all nominal information with unique document identifiers called "Universal Ids" (also referred to in the industry as UNIDs). UNIDs point uniquely to a document within a given ReplicaId instance of a database anywhere.

Technically, the combination of "Database Replica ID" and "Document Universal Id" is enough to fully identify logically any document within any Lotus Domino Server. The invention includes the provision of a virtual worldwide catalog-container—for the sake of exemplification hereinafter called Virtual.NSF—that lists for each Replica Id which is the preferred and/or authoritative site for access to it. It's envisioned to have a list of preferred sites by access protocol, typically but not taxatively (i.e.) HTTP (a.k.a. WWW), SSL (secure sockets layer) and native Lotus Notes TCP/IP protocol over port 1352 (registered as "LotusNote", single word and without the final "s" in the internet RFC public operational documents(requests for comments). The invention includes a particular usage of DNS (internet name resolution system) to refer to the containers uniquely by ReplicaId as a "Subsite" within the "world-wide virtual.nsf", which is also a technically and ethically correct way of representing all the instances of that database within the worldwide domain.

The invention solves the gap between the search engines looking for static contents and the "too dynamic" characteristics that make unique the sites hosted with the usage of Lotus Domino technologies.

Once the contents of the now properly crawlable sites are found using the algorithm described in this patent, these contents can be properly indexed. In order to do this without "added-hype", we include a module for optionally de-HTMLing the contents rendered, that optimizes the submission to search engines of documents to be indexed on the basis of the actual contents of the documents, without added keywords. Adding keywords to documents is a practice commonly used in the internet to boost the probability of a document that does NOT necessarily contain information about a subject (within the document itself), but that contains/has links to other documents that potentially do cover this subject, to behave like "door" or "access documents". Since the technologies will crawl and index all the documents, included the linked ones, it's pointless to have "door" documents pointing to documents that will also be indexed on their own merits. Since adding "door" front-pages loaded with many keywords is still a common practice—among other reasons to cope with the situation existing PREVIOUSLY to the availability of these invention/technologies—then it makes sense to remove these patches from the optimized text to be submitted to search engines.

At this point, "Joe/Joanne Public" meaning any internet user (without distinctions of gender) that is visiting his/her preferred portal or web search engine and makes a search, may receive as a result of this search one or more pointers to the virtual documents made available through our "virtually PROXIED" technologies. The more specific the query is the more likely one of our served documents will match that, the more generic the query, the more likely it will find "home" pages about that subject. The description and title submitted to the search engines actually say where the document was likely to be found at the time of submission, but since the actual link points to our "virtual.nsf", on a dynamic basis, the right container is determined, then based on the container and protocol used the right site is determined, and a document is served to the user. A complicated set of "fuzzy logic" algorithms try to determine on the fly (i.e. within milliseconds) what is the best way to serve that document, and also apply any "barring"/bans for that site based on technical or legal requirements (i.e. law enforcement requirements not to serve links to particular sites for whatever legal reason).

The Fuzzy logic described is a "best-efforts" to determine the likelihood of the requester of a page being either a human being or an automated agent, and this distinction is material for efficiency and customer satisfaction, particularly in the determination of the client software understanding of "Frames" [Frames are used in the internet pages as a way to give context and navigational tools to documents]. Our technologies find the relevant frame for a document based on the container of it (database Frame) and all this is Framed under the site (hosting the database)'s home page. This solves the problem of the so-called deep-linking, where site webmasters traditionally preferred users to HAVE to navigate from their site home page to the documents that they were looking for, for "branding" or marketing or front-store reasons, i.e. in order to get to the document they want they HAVE to see the contents of their home page and their database/container page. Many users consider this deplorable, and completely ignore links to the home page within the site as a means to finding other content relevant to them within the same site. Linking to the same site homepage for other detailed contents is normally considered poor webmastering. This inventions inverts the cycle to optimize customer/user satisfaction WHILE PRESERVING the site webmasters' interest in relevant context and access information—including relevant advertisements—being presented to users WHILE they visit their chosen page instead of as a means to get to it. Furthermore by reducing the number of steps/clicks/links that a normal user has to perform to move from the search results page to their intended document from "n" (being typically 2–10 clicks) to ONE we ensure immediate customer satisfaction AND simultaneous immediate site webmaster satisfaction because the user is exposed to all the intended context contents at once.

In terms of qualification of visits to the site, this combination increases the likelihood of the customer finding exactly what he/she was looking for almost immediately. As a relevant side benefit from these technologies, site owners will probably see a lot of "new" relevant traffic to their site what would NOT have come to it, unless the user had searched for the content he/she was looking for AT THAT SITE instead of at the user preferred search engine. Site owners listing just home pages at search engines would probably have had to buy advertisement to attract users to their sites. With this invention, it's the site contents found via search engines that bring users to the site BECAUSE the user did want to get that relevant content. This brings new users—who otherwise would never have visited the site—to the page with "the right content" (what the user really wanted to find) and "the right context" (the site Framing) as designed by the site owners. For any company that has made a serious investment in attracting and building Web traffic, this new, enhanced and selective traffic is the key to new business.

If the user has a choice of protocols and tools, i.e. he/she has access both to the Native Notes/Domino container and to the web-based crawlable content, he/she can invoke a functionality built in the virtualized pages that we serve that allows the user to switch tools, i.e. whilst looking at a document that we served to his/her web browser, he/she can click a link and automatically switch tools, i.e. Open Lotus Notes, and access the native Notes/Domino version of the document (also opened automatically!) at his/her preferred site or at the directory defined default site for Notes Native access, with ONE-operation link switching from a browser into native Notes being another unique characteristic of this invention (we preserve the actual document open across different client software packages (i.e. from Netscape/Explorer into Notes) WITHOUT the user having to manually navigate its way back into the document that had found in the other tool.

WorldWide Directory

In the preferred embodiment, the worldwide directory is a web-based system that includes a commercial site, a networking site, and a virtual container site. For example, our web-based system has several Internet Domains [and could apply for other Internet Domains] in use: dotNSF.com (the commercial site), dotNSF.net (the networking site) and dotNSF.org (the virtual container site). The virtual container site is preferably a publicly available web server, using common industry standard practices, and best of breed available clustering and redundancy tools and techniques. In the preferred embodiment, the system implementation is done with Lotus Domino as the server platform. However technically, it can be hosted with any industry standard web server technology.

Similarly, the chosen OS platform for the preferred embodiment of the web-based system is Microsoft WIN32 (combination of different version of Windows operating system, i.e. NT, etc). It should be noted, however, that since the implementation of the site is based on standards, it can be hosted within almost any industry standard platform.

A key characteristic of the invention is the DNS implementation that uses standard DNS "A" and CNAME records for the actual host names, AND "wildcard" DNS entries for the ".dotNSF.org" which is the catchall entry for all virtualized/proxied contents. It's foreseen that this sub-virtual sites can and will be further "expanded to the left" with sub-entries of the syntax "xyz.dotNSF.org" where xyz is a particular logical id of a container or sets of containers, i.e. a ReplicaId or Unique container name. Records for these sub-virtual-sites will be a combination of A, CNAME and even NS sub-delegations depending on the agreements that we may have with particular host/contents owners. Using wildcard records to uniquely logically represent .NSF containers virtualized is a key characteristic of this invention.

Affiliate Sites

The virtual container—what we called in this paper the "virtual.nsf" can be hosted by many affiliate-sites, i.e. sites that could license/agree with us the hosting of a replica (instance) of the virtualized contents/container. In this scenario, the Top Level domain may use different techniques for allocation of traffic into these sites, examples of which are what is called DNS/IP spraying, round-robin, triangulation latency check, etc. The actual technique used for the allocation of traffic is not relevant, but the fact that access to virtualized URLs (that themselves refer to contents in a unique way on a world-wide basis) for the purpose of de-virtualization into pointers to actual contents (or actual immediate contents) CAN be allocated to a set of geographically dispersed sites is relevant. Consistency in the de-virtualization process is also relevant.

Crawling Modules

The crawling algorithm is based on the reverse engineering of the emitted URLs that Lotus Domino serves as automatic links for documents displayed. For example, traditionally, when browsing or crawling the server contents, the user may see a list of databases. It the user opens a database, the user may see a list of views (classification of documents) and FOR each view the user can see many combinations of URLs pointing to documents, as many as mathematical combinations of collapse/expand/next/previous options available. This is a problem, and is definitively NOT the right way of tackling this problem.

The invention module we describe here, access the Lotus Domino Server on its "native 1352" RPC (remote procedure call) protocol and queries recursively the server structure for all containers of type "Database". For each of this Containers, it performs a check on the security of the container, determining the likelihood of anonymous (i.e. user not identified) access being allowed to the contents. Typical checks include the 1) default and 2) explicit levels of access for Anonymous, 3) the maximum level of access for the HTTP (web) protocol. If the container "is likely" (hypothesis) to contain documents that are publicly visible by "Anonymous" users using the HTTP protocol, the algorithm invokes a recursive search of all DOCUMENTS within the database. For each of these documents, it optionally checks the presence of special "Reader Fields" that may indicate that a particular document is not generally available for the wide public. If the hypothesis subsists, it constructs a unique logical name for that document, relative to the current site being crawled, in a mechanically easily readable format of convenience or "special URL" "/__1234567890123456.NSF/0/12345678901234567890123456789012", that is read as follows: Forward Slash indicating path relative to the root of the current site, double underscore followed by 16 hexadecimal characters representing the ReplicaId of the Notes/Domino database containing the document, the special sequence ".NSF" that triggers the recognition of the URL as a DOMINO URL, a forward slash followed by a single digit zero and another forward slash indicating NO view reference (this is an ESSENTIAL key piece!), and finally the 32 hexadecimal numbers representing the document unique universal id. It then performs a native HTTP request from the client software stack running at the crawler TO the HTTP stack running on the server (which is normally Lotus Domino, but that it could also be other HTTP stacks like Microsoft's Internet Server (a.k.a. IIS) that among others can handle the HTTP stack itself and pass (for fulfillment) requests for URLs in the syntax *.NSF/* to Lotus Domino http add-in task within the Lotus Domino Server. This call implementation is platform dependent, and to this extent we chose the implementation via Microsoft's WinInet package available in most current implementations of Microsoft Internet Explorer, on the basis of availability and time to market.

The actual package used to query the "special URL" is irrelevant but the FORMAT of the specially constructed URLs with NO reference to contextual views is material. At this point the Domino Server may (or may not) serve the document, with or without proper explanation, and this result code has to be properly parsed to see if something valid came back as content of the document, as requested by anonymous user over http stack! It is important to realize for the understanding of how the procedure works, that while the crawling agent has to have visibility of the existence of the record when accessing the notes server NATIVELY for crawling purposes, and this may include accessing the server with a particular Id or authentication/authorization from the webmaster, the server may and will probably have a very different attitude towards contents queried via Http anonymously. This is exactly what the module tries to determine. At this point, the module may still have document contents. Here different security/sanity/compliance check can be plugged-in, for example for checking of the contents of the document being proposed as candidate for publishing contain any kind of improper material, including parsing for list of offensive keywords, materials, and even parsing for likelihood of containing information likely NOT to be intended to be published: example: an unprotected document MAY contain a credit card number, and it's quite unlikely that the webmaster actually intended to publish that). These modules are optional plugable, and while not essential for the operation of the device, they are interesting to be considered.

Similar consideration can be given to anti-virus on the fly checking of documents to be published containing attachments (files) that can be infected, and so on. Finally, if all reasonable checks "pass" on the likelihood/balance of the probabilities/fuzzy-logic, then the document URLs if further virtualized to include the universal proxy for the nsf content, in the previous example of URL, it would look something like: a) 1234567890123456.dotNSF.org/virtual.nsf/go!open&12345678901234567890123456789012 or it's permutation (needed for some old engines not accepting too many characters at each side of the first "/") b) 12345678901234567890123456789012.1234567890123456.dotNSF.org/virtual.nsf/go or similar arrangements of this set of information, the 16 and 32 hex numbers being the last example. Now, this is read very differently, as follows, analyzing first the simpler case for a) then the more complex b).

a) Query the Delegation or actual DNS for the Internet Domain "dotNSF.org" and find recursively the ADDRESS of the subsite "1234567890123456" within the Internet Domain "dotNSF.org". The result of this DNS query is a TCP/IP ADDRESS, that we know that by design and construction is intentionally mapped by a "*.dotNSF.org" into one of the sites worldwide holding the "virtual.nsf" container. An http request into that server is done then for what is called the "path_info" (it's the name of the httpd header for the http transaction)

"/virtual.nsf/go!open&12345678901234567890123456789012". This is interpreted by the HTTP stack (Domino or whatever) to be a request for a Domino-based contents BECAUSE it contains the non case sensitive substring ".NSF". Thus the request is passed to the http add-in handler within the Lotus Domino Server, that parses that in turn as follows: Open the file Virtual.NSF, find the design element GO and do whatever that is. "GO" is a convenience name for a native domino "agent", coded as best choice for implementation in Lotus Domino "Lotuscript" native scripting language (it could be also done in Java, the principle is the same). It could also be coded in one of the many API (Application Program Interfaces) like GWAPI or DSAPI (interfaces for plugging-in C code into Lotus Domino. "Go" purpose is to re-parse the request. In order to do this, Go constructs a pointer to the server created "context" document and queries what is the actual server name typed in the URL (in this case server_name (header)="1234567890123456.dotNSF.org") and from it determines that the user is actually looking for a database with ReplicaId=1234567890123456, it goes to the master directory database and finds for that database where is the actual preferred physical location for it. It then queries the context document again and extracts whatever if any is appended to the right of the last/go, and following the convenience neutral concatenator "!Open&", in our example 12345678901234567890123456789012 being the actual UniversalId of the document we want to retrieve. This 32 byte hex string CAN BE OMMITTED and in this case the reference is intended to whatever is the opening document for the container or database, which we will see is relevant much later for the determination of the proper database context for a particular document.

b) syntax is a permutation of a), functionally equivalent parsing is obtained just by querying the servername header received by the Go agent. An implementation detail that we consider essential as well-behaved Internet netizens is to establish that our DNS servers will resolve *.dotNSF.org with a TimeToLive (TTL) of zero meaning DO NOT CACHE or functionally equivalent VERY short time (minutes!). This is to prevent flooding of DNS caching entries at the resolvers and DNS caching machines involved in the DNS queries that we perform in-house and that users could perform accessing virtual URLs when they find them in the search engines.

After all this, each document that passed the process has a virtualized unique worldwide address for it, that contains NOTHING else (no-noise URLs). Either the pages are submitted individually to search engines that allows us to do that, or we insert that generated URL at the end of the lists of URLs that we keep asking search engines to index. In our implementation the example name would be we add "1234567890123456.dotNSF.org/virtual.nsf/go open&12345678901234567890123456789012" at the end of the document list called "CrawlmePlease". As well behaved robot friendly site, we tag the list itself with the META attribute "robots" set to "FOLLOW" meaning please follow and index all the pages listed in this list (do not necessarily index this list itself). In comparison, pages are submitted with INDEX,NOFOLLOW to prevent unuseful crawling. For efficiency—bandwidth primarily—we do cache the contents retrieved from the URL into a disk database accessible with the combination of the 2 hex numbers: Replica Id/UniversalDoc ID. For each document or database cached we store where is the authoritative site for it, the HTML retrieved from the site, and also for efficiency we pre-compute different possible replies to a query for that page, that we will use later when serving the page to a "client".

In the meantime, the search engines crawl us, and we also index our master contents, which are also indexable and searchable. We are not just a Meta-Search-Engine feeder but also a search-engine/portal ourselves toward all contents of whatever (legal:-) kind hosted in Notes/Domino everywhere on a worldwide basis.

Serving Modules (meaning the module that actually serves the pages upon requests from a "client")

When a "client" requests a virtual URL, the agent "go" tries to determine using fuzzy-logic/heuristics and a combination of criteria including HTTP header parsing (concrete examples: Agent, type of contents accepted (Oust text or whatever),IP Address, IP Hostname, Cookies, etc) in order to find out the likelihood of a client being "human" or "program", and based on that, the need for serving properly "framed" contents, optimized indexable text, or a combination of these (for usability and cost performance reasons it's a poor implementation to have a on-size-fits-all, the optimal implementation has to differentiate among these classes of clients). If the "client" is a crawler, the optimized sanitized de-html-tagged contents of the real page are served, within the context of a proxy virtual document with the minimal unique info in it to link back to us.

If the client is a user, and we have means to think it's frame enabled (see later) we send just the frame reference to us with navigational tools for dotNSF+banner, the frame for the home page of the site serving that page typically on the top, the context frame for the database (typically on the bottom left) and the actual document (typically on the bottom right). Countries or cultural-difference-aware sites implementation may differ, i.e. countries reading right to left or vertically may prefer other layouts. This is all customizable based on user preferences, archived in profiles and/or cookies. In the 3rd case, when we do not know if the user is a program or a person, we serve a jolly (has every possible combination) document with a set-cookie statement that is executed ONLY by an actual client (it's not META nor in the header, it's sent as script executed by the client but typically NOT executed by robots. The next time that user requests something from us we will know it's a human if the set-cookie is accepted (some users and sites disable cookies, and we allow for that, we just have to serve more text down the wire but it does work 100% ok!).

It is possible that the client requests a document that we do not have yet cached or even a database that we do now know where to find. In the first case, if the user asks us for a document that we do not have in cache for a database that we do know about, we just try to get that contents on the fly. If the client requests a replica-id that we do not know about, we use a fast "HEAD" query for that replica id across all the sites likely to host that application, with different degrees of search based on the profile of the user and its commercial status (i.e. we may search popular sites for free and we may search most/all known sites for a fee).

In both cases, similar logic and criteria as previously explained are used. Most user programs will allow for a reasonable time to serve it, but most crawlers will NOT, so it's essential to secure good Internet connectivity for the provision of this service, and state of the art hardware. Our current implementation uses Pentiums IIs and IIIs for domino servers and for DNS, but obviously this is intended to mean best you can afford at each current state of the art.

Registration Modules

The system has some directly usable Library functions, that exploit functionality originally built into Lotus Notes/Domino: A Lotus Notes user can invoke the functionality of File Database Publish to—as the name suggest—list the database in a user accessible database container. We use that functionality, with some expansion for Security Controlled Cryptographically Signed (for non repudiation of contents and acceptance of terms of usage) Sections in the UI customization. This access—for requesting crawling is typically done over the internet over protocol 1352 with PKI (public key infrastructure) based document signatures and optionally for dynamically negotiated PKI based session traffic encryption keys (for optional privacy). If the user accessed the CRAWLme.nsf site from a browser, he/she is presented with a client-context switcher screen that uses the technology described later in this paper to continue the registration with Notes Native secure access.

Context Framing

Already referred to, is the concept of reverse engineering the minimal optimal likely path that a user visiting the site would have had to browse to expose the user to that ALL that framed context+content "just one click away" from the search engine results pages from their popular/preferred search engines/portals.

Client Context Switching

This piece of the invention relies on the knowledge of the actual replica id of the container and the universal id of the document currently being served to a browser. When the user clicks on the link contained in the built-page that we served to him/her, he/she is actually invoking another agent (in our implementation for time to market we chose Lotuscript, could be any language), the agent uses similar context finding techniques to determine what document is the user actually looking at, in what database. It then replies with a full HTTP reply including "content-type: Application/ndl" MIME header, followed by a series of text lines in NDL format. NDL is a format that Lotus Notes and Domino use internally for doc-link hypertextual management. What we serve to the client is dynamically generated on the fly MIME contents that look like received attachments from the server to the client, very tiny text messages, typically very few lines.

When the user clicks on "open" as a choice for the received MIME content the browser client consults the MIME database types (typically in the windows registry in the win32 example environment) and determine that MIME type "application/ndl" corresponds to the file extension ".NDL" which in turn is handled by the Lotus Notes client software (the std Lotus Notes registration does this setup automatically). Thus the few lines received are passes to Notes.exe for execution. Notes reads the replica Id and the document ID (we do NOT supply view reference which is also a key invention). We supply as "hint" site a pointer to the Notes Domino FullName of our site.

The way the link is solved by Notes client is exactly the same as if a user had clicked any hypertextual link in a native notes database; the user work space is searched for that particular replica id database, and only if not found the "hint" server is considered. Users having found documents in a web search that they would prefer to have access to under native notes, probably in their intranet (example many industry analyst's publications are available in Notes databases, reference materials, manuals, etc provided by many publishers) will see the document automatically being opened "just one click away" from the browser. Again, the database is opened natively, and the document the user was reading in a browser is now available for notes native access.

Link.ndl is a piece of lotuscript code residing in a website called virtual.nsf, that functions as a cgi-script that parses the received path and parameter and returns a "typed" content that is recognized by browsers as an invocation of Lotus Notes client. The code is readable in the sense that relevant variables are mnemonically named.

```
'Link.ndl sample code
Option Public
Option Declare
Sub Initialize
    Dim S As New NotesSession,J As Long,ContextDoc As NotesDocument,TargetRepId As String,TargetUnid As String
    Set ContextDoc=S.DocumentContext
    Dim X As String
    J=Instr(UcaseS(ContextDoc.HTTP_Referer(0)), {?OPEN&})
    If(J=0)Then
    Print{[/]}
    Else
        X=Mid$(ContextDoc.HTTP_Referer(0),J+6)
        J=Instr(X,{.})
        TargetUnid=Ucase$(Mid$(X,1,32))
        TargetRepId=Ucase$(Mid$(X,34,16))
        Print{Content-type: application/ndl}
        Print
        Print{<NDL>}
        Print{<REPLICA }& Mid$(TargetRepId,1,8) &{:}& Mid$(TargetRepId,9,8) &{>}
        If(TargetUnid<>{})Then Print{<NOTE OF} & Mid$(TargetUnid,1,8) &{·}&Mid$(TargetUnid,9,8) &{-ON} & Mid$(TargetUnid,17,8)
&{:}&Mid$(TargetUnid,25,8) &{>}
        Print{<HINT}dotNSF.theconifers.com</HINT>}
        Print{</NDL>}
    End If
End Sub
```

Notes Native access to our site

We do allow remote access to our site using protocol LotusNote(s) over secure port 1352. We use the standard PKI that Lotus Notes/Domino provides for certification/cross-certification/encryption and non-repudiability. In order to simplify even more the usage of the system, we include in our hierarchical naming convention for our servers a "common name" that is equal to the Internet Domain, for example dotNSF.org/TheConifers is the abbreviated format of the canonicalised name "CN=dotNSF.org/O=TheConifers", which allows us very fast cached access to the Internet Domain address. We map our Internet Domain to the Lotus Domino Server Address in our DNS specification by means of the usage of a "@ A xxx.xxx.xxx.xxx" syntax in our DNS. Since it is legal to have multiple A records for a given hostname (in this case the absolute name dotNSF.org. [note the final dot after org]) then we can have different servers in different sites or networks having the O=to imply the physical location of the site.

The syntax allows for expansion where up to 4 intermediate OU=can be specified in the Notes/Domino Hierarchical name to signify affiliation and location within organization. It's innovative to have this reverse usage of CN=Internet Domain and O=Site. The user benefit is immediate built in site redundancy and client failover support against site outages and also against partial network outages anywhere in between the user and any of the worldwide distributed server farm/clusters.

The application as described above may be implemented in a Lotus Notes Domino database. For further understanding of the present invention, the following code is embedded in its LotusScript library and provides the described functionality. A LotusScript library is a collection of routines visible from within the application. In a preferred embodiment of the invention, the re-usable code is confined into a library whose functions are mnemonically named. While it is not necessary to confine the code into a library, it is generally accepted as good programming practice. The modules of the library are called from different user interfaces (UI) and are also used when replying to search engines requests. Within the code there are references to actual live sites and thus the code is intended as a working example of heuristic rules coded into the system to determine the likely location of material which needs to be deduplicated against generally well known authoritative sources of content.

```
CURRENT "sample" CODE:
'dotNSF:
Option Public
Option Declare
'dotNSF:
Declare Function InternetOpen Lib{wininet.dll}Alias{InternetOpenA} (Byval lpszCallerName As
String,Byval dwAccessType As Long,Byval lpszProxyName As String,Byval lpszProxyBypass As
String,Byval dwFlags As Long)As Long
Declare Function InternetConnect Lib{wininet.dll}Alias{InternetConnectA} (Byval hInternetSession
As Long,Byval lpszServerName As String,Byval nProxyPort As Integer,Byval lpszUsername As
String,Byval lpszPassword As String,Byval dwService As Long,Byval dwFlags As Long, Byval dwContext
As Long)As Long
Declare Function HttpOpenRequest Lib{wininet.dll}Alias{HttpOpenRequestA} (Byval hInternetSession
As Long,Byval lpszVerb As String,Byval lpszObjectName As String,Byval lpszVersion As String,Byval
lpszReferer As String,Byval lpszAcceptTypes As Long,Byval dwFlags As Long,Byval dwContext As
Long)As Long
Declare Function HttpSendRequest Lib{wininet.dll}Alias{HttpSendRequestA} (Byval hHttpRequest As
Long,Byval sHeaders As String,Byval 1HeadersLength As Long,Byval sOptional As String,Byval
1OptionalLength As Long(As Integer
Declare Function HttpQueryInfo Lib{wininet.dll} Alias{HttpQueryInfoA} (Byval hHttpRequest As
Long,Byval 1InfoLevel As Long,Byval sBuffer As String,1BufferLength As Long,1Index As Long)As
Integer
Declare Function InternetGetLastResponseInfo
Lib{wininet.dll}Alias{InternetGetLastResponseInfoA} (lpdwError As Long,Byval lpszBuffer As
String, lpdwBufferLength As Long)As Integer
Declare Function InternetOpenUrl Lib{wininet.dll}Alias{InternetOpenUrlA} (Byval hInternetSession
As Long,Byval lpszServerName As String,Byval lpszHeaders As String,Byval dwHeadersLength As
Long,Byval dwFlags As Long,Byval dwContext As Long)As Long
Declare Function InternetCloseHandle Lib{wininet.dll} (Byval hInternetHandle As Long)As Integer
Declare Function InternetReadFile Lib{wininet.dll} (Byval hfile As Long,Byval sBuffer As
String,Byval 1NumberofBytesToRead As Long,1BytesRead As Long)As Integer
Declare Function HttpEndRequest Lib{wininet.dll}Alias{HttpEndRequestA} (Byval hfile As Long,Byval
MustBeNull As String,Byval dwFlags As Long,Byval dwContext As Long)As Integer
Declare Function InternetQueryDataAvailable Lib{wininet.dll} (Byval hFile As Long,QBytes As
Long,Byval dwFlags As Long,dwContext As Long)As Integer
Const INTERNET_OPEN_TYPE_PRECONFIG=0
Const INTERNET_FLAG_RELOAD&H80000000
Const HSR_DOWNLOAD&H00000010
Const HSR_SYNC=&H00000004
Public Const HTTP_QUERY_CONTENT_TYPE = 1
Public Const HTTP_QUERY_CONTENT_LENGTH = 5
Public Const HTTP_QUERY_EXPIRES = 10
Public Const HTTP_QUERY_LAST_MODIFIED = 11
Public Const HTTP_QUERY_PRAGMA = 17
Public Const HTTP_QUERY_VERSION = 18
Public Const HTTP_QUERY_STATUS_CODE = 19
Public Const HTTP_QUERY_STATUS_TEXT = 20
Public Const HTTP_QUERY_RAW_HEADERS = 21
Public Const HTTP_QUERY_RAW_HEADERS_CRLF = 22
```

-continued

```
Public Const HTTP_QUERY_FORWARDED = 30
Public Const HTTP_QUERY_SERVER = 37
Public Const HTTP_QUERY_USER_AGENT = 39
Public Const HTTP_QUERY_SET_COOKIE = 43
Public Const HTTP_QUERY_REQUEST_METHOD = 45
Public Const HTTP_STATUS_DENIED = 401
Public Const HTTP_STATUS_PROXY_AUTH_REQ = 407
Function JchGetHtml(Url As String)As String
    On Error Goto kaput
    Dim hInternetOpen As Long,hUrl As Long,hHttpOpenRequest As Long, result As Integer,i As
Integer,r As Integer,qa As Long
    Dim vDoLoop As Variant,1NumberOfBytesRead As Long,bRet As Variant,sReadBuffer As
String,sBuffer As String
    sBuffer={}
    hInternetOpen=InternetOpen({SpiderTest.dotNSF.org},0,{},{},0)
    If hInternetOpen<>0 Then
        hUrl=InternetOpenUrl(hInternetOpen,{http://}&Url,{},0,INTERNET_FLAG_RELOAD,0)
        If(hUrl<>0)Then
            InternetQueryDataAvailable hURL,qa,0,0
            vDoLoop=True
            While vDoLoop
                sReadBuffer=Space(2048)
                1NumberOfBytesRead=Len(SReadBuffer)
bRet=InternetReadFile(hUrl,sReadBuffer,1NumberOfBytesRead,1NumberOfBytesRead)
                sBuffer=Sbuffer & Left$(sReadBuffer,1NumberOfBytesRead)
                vDoLoop=(1NumberOfBytesRead>0)
            Wend
        End If
        Dim X As String,J As Long
        X=Ucase$(sBuffer)
        J=Instr(X,{</TITLE>})
        If(J>0)Then X=Left$(X,J+7)
        If(Instr(X,{<TITLE>SERVER
LOGIN</TITLE>})+Instr(X,{<TITLE>ERROR</TITLE>})+Instr(X,{<TITLE>HTTP 40})+Instr(X,{<TITLE>IBM
SERVER ERROR:})=0) Then JchGetHtml=sBuffer Else JchgetHtml={}
        InternetCloseHandle (hInternetOpen)
    End If 'hInternetOpen
    Exit Function
Kaput:
    Print {Oops:},Erl,Err,{<br>}
    Resume Next
End Function
Function ReSrcHtml (H As String,U As String,U2)
    Dim T2 As String,U3 As String,S As New NotesSession
    If U2<>{}Then U3=U2 Else U3=u
    T2=H
    If(T2={}) Then
        REM Q&D WAY OF CATCHING NON PUBLICLY VAILABLE STUFF
        ReSrcHtml={}
        Exit Function
    End If
    Dim J As Long,J2 As Long
    J=Instr(Ucase$ (t2),{<META NAME="ROBOTS" CONTENT="NOINDEX">})
    If(J>0)Then t2=Left$(t2,J-1) & Mid$(t2,J+Len({<META NAME="robots" CONTENT="noindex">})) 'cut
this crap out!
    J= Instr(10,Ucase$(t2),{<HTML>})
    If J>0 Then t2=Mid$(t2,J) 'cut this crap out!
    J=Instr(Ucase$(t2),{</HTML>})
    If(J>0)Then t2=Left$(t2,J-1) & Mid$(t2,J+Len({</HTML>})) 'cut this crap out!
    Dim T As String
    T={BACKGROUND="/}
    J=Instr(Ucase(t2),T)
    While J>0
        t2=Left$(t2,J+Len(T)-2) + {http://} + U3 + Mid$(t2,J+Len(T)-1)
        J=Instr(Ucase$(t2),T)
    Wend
    T={BACKGROUND=/}
    J=Instr(Ucase(t2),T)
    While J>0
        t2=Left$(t2,J+Len(T)-2) = {http://} + U3 + Mid$(t2,J+Len(T)-1)
        J=Instr(Ucase$(t2),T)
    Wend
    T={BACKGROUND= /}
    J=Instr(Ucase(t2),T)
    While J>0
        t2=Left$(t2,J+Len(T)-2) + {http://} + U3 + Mid$(t2,J+Len(T)-1)
        J=Instr(Ucase$)t2),T)
    Wend
    T={HREF="/}
```

-continued

```
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    T={HREF=/}
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    T={HREF= /}
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    T={SRC="/}
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    T={SRC=/}
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    T={SRC= /}
    J=Instr(Ucase(t2),T)
    While J>0
        t2=Left$(t2,J+Len(T)−2) + {http://} + U3 + Mid$(t2,J+Len(T)−1)
        J=Instr(Ucase$(t2),T)
    Wend
    ReSrcHtml=t2
End Function
Function JchDecodeUrl(U As String)
    Dim X As String,I As Integer,ReplicaId As String,Unid As String
    ReplicaId={}
    Unid={}
    If Left$(U,1)={A}Then
        For I=1 To 16
            ReplicaId=ReplicaId=Mid$(U,3*i−2,2)
            Unid=Unid+Mid$(U,3*i,1)
        Next
        JchDecodeUrl=Unid &{.}& ReplicaId &{.Db.dotNSF.org/virtual.nsf/go!open}
    Else
        Print{InvalidInput!}
    End If
End Function
Function JchEncodeUrl(ReplicaId As string,Unid As String)
    Dim X As String,I As Integer
    For I=1 To 16
        X=X+Mid$(ReplicaId,2*I−1,2) +Mid$(Unid,I,1)
    Next
    JchEncodeUrl={A} & X & {.dotNSF.org/virtual.nsf/decode!open}
End Function
Function WhereIsIt(DbDoc As NotesDocument,TargetDbUrl As String)As String
    Dim Candidate As String,Html As String
    'THIS COULD BE RECODED TO HANDLE JUST THE "HEAD TITLE" ATTRIBUTE
    Candidate={www.lotus.com}
    If(CheckUrl(Candidate & TargetDbUrl))Then
        Html=JchGetHtml(Candidate & TargetDbUrl)
        If(Html<>{})Then
            DbDoc.Html=ReSrcHtml(Html,Candidate,Candidate)
            WhereIsIt=Candidate
            Exit Function
        End If
    End If
    Candidate={www.notes.net}
    If(CheckUrl(Candidate & TargetDbUrl))Then
        Html=JchGetHtml(Candidate & TargetDbUrl)
        If(Html<>{})Then
            DbDoc.Html=ReSrcHtml(Html,Candidate,Candidate)
            WhereIsIt=Candidate
            Exit Function
            End If
        End If
```

-continued

```
        Candidate={partners.lotus.com}
        If(CheckUrl(Candidate & TargetDbUrl))Then
            Html=JchGetHtml(Candidate & TargetDbUrl)
            If(Html<>{})Then
                DbDoc.Html=ReSrcHtml(Html,Candidate,Candidate)
                WhereIsIt=Candidate
                Exit Function
            End If
        End If
        Candidate={www.emea.lotus.com}
        If(CheckUrl(Candidate & TargetDbUrl))Then
            Html=JchGetHtml(Candidate & TargetDbUrl)
            If(Html<>{}))Then
                DbDoc.Html=ReSrcHtml(Html,Candidate,Candidate)
                WhereIsIt=Candidate
                Exit Function
            End If
        End If
        Candidate={194.196.39.11}
        If(CheckUrl(Candidate & TargetDbUrl))Then
            Html=JchGetHtml(Candidate & TargetDbUrl)
            If(Html<>{})Then
                DbDoc.Html=ReSrcHtml(Html,Candidate,Candidate)
                WhereIsIt=Candidate
                Exit Function
            End If
        End If
        Candidate={www.ibm.com}
        If(CheckUrl(Candidate & TargetDbUrl))Then
            Html=JchGetHtml(Candidate & TargetDbUrl)
            If(Html<>{})Then
                DbDoc.Html=ReSrcHtml(Html,Candidate,Candidate)
                WhereIsIt=Candidate
                Exit Function
            End If
        End If
        Candidate={dotnsf.org}
        If(CheckUrl(Candidate & TargetDbUrl))Then
            Html=JchGetHtml(Candidate & TargetDbUrl)
            If(Html<>{})Then
                DbDoc.Html=ReSrcHtml(Html,Candidate,Candidate)
                WhereIsIt=Candidate
                Exit Function
            End If
        End If
        Candidate={www.zel.it}
        If(CheckUrl(Candidate & TargetDbUrl))Then
            Html=JchGetHtml(Candidate & TargetDbUrl)
            If(Html<>{})Then
                DbDoc.Html=ReSrcHtml(Html,Candidate,Candidate)
                WhereIsIt=Candidate
                Exit Function
            End If
        End If
        DbDoc.Html=JchGetHtml(TargetDbUrl)
        WhereIsIt={www.theconifers.com}
    End Function
    Function LogClient(ContextDoc As NotesDocument,SitesView As NotesView)As NotesDocument
        Dim ClientDoc As NotesDocument
        If ContextDoc.Http_Cookie(0)<>{})Then
            Set ClientDoc=SitesView.GetDocumentByKey(ContextDoc.Http_Cookie(0),True)
            If Not ClientDoc Is Nothing Then
                If ClientDoc.Blacklist(0)={Yes} Then
                    Set LogClient=ClientDoc
                    Print{Sorry, you have been blacklisted}
                    Exit Function
                End If
            End If
        End If
    If ContextDoc.Http_Referer(0)<>{})Then
        Set ClientDoc=SitesView.GetDocumentByKey(ContextDoc.Http_Referer(0),True)
        If Not ClientDoc Is Nothing Then
            If ClientDoc.Blacklist(0)={Yes} Then
                Set LogClient=ClientDoc
                Print{Sorry, you have been blacklisted}
                Exit Function
            End If
        End If
    End If
```

-continued

```
    If ContextDoc.Remote_Host(0)<>{})Then
        Set ClientDoc=SitesView.GetDocumentByKey(ContextDoc.Remote_Host(0),True)
        If Not ClientDoc Is Nothing Then
            If ClientDoc.Blacklist(0)={Yes} Then
                Set LogClient=ClientDoc
                Print{Sorry, you have been blacklisted}
                Exit Function
            End If
        End If
    End If
    Set ClientDoc=SitesView.GetDocumentByKey(ContextDoc.Remote_Addr(0),True)
    If Not ClientDoc Is Nothing Then
        If ClientDoc.Blacklist(0)={Yes} Then
            Set LogClient=ClientDoc
            Print{Sorry, you have been blacklisted}
            Exit Function
        End If
    End If
    If ClientDoc Is Nothing Then
        Set ClientDoc=New NotesDocument(SitesView.Parent)
        ClientDoc.Remote_Host=ContextDoc.Remote_Host(0)
        ClientDoc.Remote_Addr=ContextDoc.Remote_Addr(0)
        ClientDoc.Form={Site}
    End If
    If Instr(ContextDoc.REMOTE_HOST(0),{.alta-vista.net})>0 Then
ClientDoc.EngineName=ContextDoc.HTTP_USER_AGENT(0)
    If Instr(ContextDoc.REMOTE_HOST(0),{.lycos.})>0 Then
ClientDoc.EngineName=ContextDoc.HTTP_USER_AGENT(0)
    If Instr(ContextDoc.REMOTE_HOST(0),{.hotbot.})>0 Then
ClientDoc.EngineNameContextDoc.HTTP_USER_AGENT(0)
    If Instr(ContextDoc.REMOTE_HOST(0),{.av.com})>0 Then
ClientDoc.EngineNameContextDoc.HTTP_USER_AGENT(0)
    Dim ClientLog As NotesRichTextItem
    Set ClientLog=ClientDoc.GetFirstItem({Body})
    If ClientLog Is Nothing Then Set ClientLog=New NotesRichTextItem(ClientDoc,{Body})
    If ClientDoc.Remote_Addr(0)<>{194.201.124.222}Then
        ClientLog.AddNewLine 1
        ClientLog.AppendText Date$ & { } & Time$
        ClientLog.AddNewLine 1
        Forall F In ContextDoc.Items
            If F.Values(0)<>{}Then
                ClientLog.AppendText F.Name &{=}& F.Values(0)
                ClientLog.AddNewLine 1
            End If
        End Forall
    End If
    ClientDoc.Save False,False,False
    Set LogClient=ClientDoc
End Function
Sub DoCrawl(Db As NotesDatabase)
    ' On Error Resume Next
    If Not db.isOpen Then db.open {},{}
    If Db.IsOpen Then
        Dim T As String
        T=Db.ReplicaId
        Dim H As String
        H=JchgetHtml(T &{.dotNSF.org/virtual.nsf/go!open})
        If(H<>{})Then
            Print{Crawling:},Db.FilePath,Db.Title
            Dim Dc As NotesDocumentCollection,Doc As NotesDocument
            Set Dc=Db.AllDocuments
            Set Doc=Dc.GetFirstDocument
            While Not Doc Is Nothing
                T=Doc.UniversalId &{.}& Db.ReplicaId
                JchgetHtml(T &{.dotNSF.com/virtual.nsf/go})
                Set Doc=Dc.GetNextDocument(Doc)
            Wend
        End If
        db.close
    End If
End Sub
Function CheckUrl(U As String)As Integer
    CheckUrl=JchGetHtml(U)<>{}
    Exit Function
    ' TEMPORARY QUICK FIX
    Dim hInternetOpen As Long,hInternetConnect As Long,hHttpOpenRequest As Long,bRet As Variant
    hInternetOpen=InternetOpen({SpiderTest.dotNSF.org},0,{},{},0)
    If hInternetOpen<>0 Then
        hInternetConnect=InternetConnect(hInternetOpen,U,80,{},{HTTP/1.0},3,0,0)
```

-continued

```
        If hInternetConnect<>0 Then
hHttpOpenRequest=HttpOpenRequest(hInternetConnect,{HEAD},{},{},{},0,&H80000000,0)
            If hHttpOpenRequest<>0 Then
                If HttpSendRequest(hHttpOpenRequest, {}, 0, {}, 0) Then
                    Dim sBuff As String*1024
                    Dim 1BuffLen As Long
                    1BuffLen=Len(sBuff)
If(HttpQueryInfo(hHttpOpenRequest,38,sBuff,1BuffLen,0)=1)Then CheckUrl=(Left$(sBuff,3)={200})
                End If
            End If
        End If
    End If
    If hInternetOpen<>0 Then InternetCloseHandle(hInternetOpen)
    If hInternetConnect<>0 Then InternetCloseHandle(hInternetConnect)
    If hHttpOpenRequest<>0 Then InternetCloseHandle(hHttpOpenRequest)
End Function
Function UnHtml(H As String)As String
    Dim J As Long,Txt As String,Deep As Integer
    Deep=0
    Txt={}
    For J=1 To Len(H)
        Dim X As String
        X=Mid$(H,J,1)
        If X={<}Then Deep=Deep+1
        If Deep=0 Then Txt=Txt+X
        If X={>}Then Deep=Deep−1
    Next
    UnHtml=Txt
End Function
Sub eFraming
    On Error Goto kaput
    Dim S As New NotesSession,J As Long,Db As NotesDatabase,SitesView As NotesView, ContextDoc As
NotesDocument,Title As String,MyTempUrl as String
    Set Db=S.CurrentDatabase
    Set SitesView=Db.GetView({Sites})
    Set ContextDoc=S.DocumentContext
    Dim Wru As NotesDocument
    Set Wru=LogClient(ContextDoc,SitesView)
    If Wru.Blacklist(0)={Yes}Then Exit Sub'Fanculo
    Dim TargetRepId As String,TargetDbUrl As String,TargetUnid As String
    TargetUnid={}
    J=Instr(ContextDoc.Server_Name(0),{.})
    If(J=17) Then
            TargetRepId=Ucase$(Mid$(ContextDoc.Server_Name(0),1,16))
            J=Instr(Ucase$(ContextDoc.Query_String(0)),{!OPEN&})
            If(J>0)Then TargetUnid=Mid$(contextDoc.Query_String(0),J+6)
    Else
            TargetUnid={/0/}& Ucase$(Mid$(ContextDoc.Server_Name(0),1,32))
            TargetRepId=Case$(Mid$(ContextDoc.Server_Name(0),34,16))
    End If
    If Ucase$(TargetRepId)=Ucase$(Db.ReplicaId) Then
        REM handle recursivity, somebody crawled Virtual ITSELF!
            Print {[[/virtual.nsf} & TargetUnid & {]]}
            Exit Sub
    End If
    TargetDbUrl={/}& TargetRepId &{.nsf}
    rem (4.6x) TargetDbUrl={/}& TargetRepId
    REM Find the Db by REPLICA:ID in the hidden view
    Dim DbDoc As NotesDocument
    Set DbDoc=Db.GetView({($RepId)}).GetDocumentByKey(Mid$(TargetRepId,1,8) &{:}&
Mid$(TargetRepId,9,8),True)
    If DbDoc Is Nothing Then
            Set DbDoc=New NotesDocument(Db)
            DbDoc.ReplicaID=Mid$(TargetRepId,1,8) &{:}& Mid$(TargetRepId,9,8)
            DbDoc.Form={Db}
            DbDoc.AddedBy=S.CurrentAgent.Name
            DbDoc.AddedUponRequestOf=ContextDoc.Remote_Host(0) &{ @ }& ContextDoc.Remote_Addr(0)
            DbDoc.IpAddress={dotNSF.Org}
            DbDoc.MyURL=TargetRepId 'KAPUT OLD CODE ?
Left$(ContextDoc.Server_Name(0),Instr(Ucase$(ContextDoc.Server_Name(0)),{.PROXY})−1)
            DbDoc.PhysicalUrl=WhereIsIt(DbDoc,TargetDbUrl)'This also gets the actual page!!!
            J=Instr(Ucase$(DbDoc.HTML(0)),{<TITLE>})
            If(J>0)Then DbDoc.Subject={"http://} & DbDoc.PhysicalUrl(0) & { − } &
Mid$(DbDoc.Html(0),J+7,Instr(Ucase$(DbDoc.Html(0)),{<TITLE>})−J−7) &{"}
                REM get ROBOTS.TXT
            If(0)Then
                    REM WE STILL NEED TO HANDLE THIS SHIT!!!
                    Dim RobotsTxt As String
                    RobotsTxt=JchGetHtml(DbDoc.PhysicalUrl(0) &{/robots.txt})
```

-continued

```
                    DbDoc.robotsTXT=RobotsTxt
          End If
          If(DbDoc.Html(0)<>{})Then DbDoc.Save False,False,False 'ojo save va anche se questo
viene tolto !
    End If
    If DbDoc.PhysicalUrl(0)={}Then DbDoc.PhysicalUrl=DbDoc.IPAddress(0)
    REM Find if we do have already that document in our published Virtual.nsf
    Dim TargetRecordUrl As String
    TargetRecordUrl=TargetDbUrl & TargetUnid
    Dim CachedHtmlDocs As NotesDocument
    Set CachedHtmlDocs=Db.GetView({Urls}).GetDocumentByKey(TargetRecordUrl,False)
    If CachedHtmlDocs Is Nothing Then
          Set CachedHtmlDocs=New NotesDocument(Db)
          CachedHtmlDocs.Url=TargetRecordUrl
          Dim Html As String
          Html=JchgetHtml({localhost}& TargetRecordUrl)
          If Html={}Then Html=JchGetHtml(DbDoc.PhysicalUrl(0) & TargetRecordUrl)
          If(html={})Then
                Print{<html><head><title>HTTP 404 Not Found: }& DbDoc.PhysicalUrl(0) &
TargetRecordUrl &{</title></head>}
                Exit Sub 'FANCULO
          End If
          CachedHtmlDocs.StdHtml=Html
          Html=ReSrcHtml(Html,DbDoc.IpAddress(0),DbDoc.PhysicalUrl(0))
          CachedHtmlDocs.Form={HtmlDocument}
          CachedHtmlDocs.Orig=ContextDoc.Server_Name(0)
          J=Instr(Ucase$(HTML),{<TITLE>})
          If(J=0)Then
                Title={}
          Else
                Title=Mid$(Html,J+7,Instr(Ucase$(Html),{</TITLE>})–J–7)
          End If
          CachedHtmlDocs.Subject={"http://} & DbDoc.PhysicalUrl(0) & { – } & title & {"}
          REM Hybrid version as before!!! - Do not touch yet !
          Dim Hb As New NotesRichTextItem(CachedHtmlDocs,{HTML})
          Hb.AppendText{<HEAD><TITLE>}& Title & {</TITLE><META name="description"
contents="http://} & DbDoc.PhysicalUrl(0) & { – } & title & {"><META name="robots"
contents="index,nofollow,noimageindex">)
          Hb.AppendText{<META name="updated" contents="daily,weekly"<>META
name="BotFriendlyProxyBy" contents="http://dotNSF.org">}
          'Hb.AppendText{<script>document.cookie=dotNSF="}& Wru.UniversalId &{;
expires=Tuesday, 31-Dec-2020 08:00:00 GMT; path=/; domain=dotNSF.org";}
          'Hb.AppendText{document.cookie=dotNSF=")& Wru.UniversalId &{; expires=Tuesday, 31-
Dec-2020 08:00:00 GMT; path=/; domain=dotNSF.com";</Script>}
          Hb.AppendText{</HEAD><FRAMESET ROWS=150,*><NOFRAMES>}
          Hb.AppendText{<!-- Attention: THIS meta page Copyright 1999,2000 by dotNSF, Inc.
All Rights Reserved. -->}
          J=Instr(Ucase$(Html),{</HEAD})
          If False And (J>0)Then
                Hb.AppendText Left$(Html,J–1)
                Hb.AppendText{<META name="description" contents="http://} &
DbDoc.PhysicalUrl(0) & { – } & title & {"><META name="robots"
contents="index,nofollow,noimageindex">}
                Hb.AppendText{<META name="updated" contents="daily,weekly"><META
name="BotFriendlyProxyBy" contents="http: //dotNSF.com">}
          End If
          Hb.AppendText Mid$(Html,J)
          Hb.AppendText{<a href=http://"}& DbDoc.PhysicalUrl(0)& TargetRecordUrl &{">document
moved!</a>}
          Hb.AppendText{</noframes><FRAME
SRC="http://194.201.124.222/virtual.nsf/Assembled?Open&}& ContextDoc.Server_Name(0) &{" noresize
framespacing=0 frameborder=yes border=0 marginwidth=0 marginheight=0 scrolling=no>}
          Hb.AppendText{<FRAMESET ROWS=35%,*><FRAME SRC="http://} & DbDoc.PhysicalUrl(0) &
{">}
          If TargetUnid<>{}Then Hb.AppendText{"<FRAMESET COLS=35%,*><FRAME SRC="http://} &
DbDoc.PhysicalUrl(0) & TargetDbUrl &{">}
          Hb.AppendText{<FRAME SRC="http://} & DbDoc.PhysicalUrl(0) & TargetRecordUrl &
{"></frameset></frameset></frameset>}
          Hb.AppendText{<!-- Attention: THIS page Copyright 1999,2000 by George Chiesa and
dotNSF, Inc. All Rights Reserved. -->}
          REM Text Version for PURE KNOWN search engines!!!
          Dim Ht As New NotesRichTextItem(CachedHtmlDocs,{TXT})
          Ht.AppendText{<HEAD><TITLE>}& Title &{</TITLE>}
          Ht.AppendText{<META name="description" contents=37 http://} & DbDoc.PhysicalUrl(0) & {
- } & title & {">}
          Ht.AppendText{<META name="robots" contents="index,nofollow,noimageindex"><META
name="updated" contents="daily,weekly"><META name="BotFriendlyProxyBy"
contents="http://dotNSF.com">}
          Ht.AppendText{</HEAD><BODY>}& UnHtml(html) &{</BODY><HTML>}
```

-continued

```
            Ht.AppendText{!-- Attention: THIS page Copyright 1999,2000 by George Chiesa and
dotNSF, Inc. All Rights Reserved. -->}
            REM Frames Version for HUMAN consuption
            Dim Hf As New NotesRichTextItem(CachedHtmlDocs,{Framed})
            Hf.AppendText{<HEAD><TITLE>}& Title &{</TITLE>}
            'Hf.AppendText{<script>document.cookie=dotNSF="}& Wru.UniversalId &{;
expires=Tuesday, 31-Dec-2020 08:00:00 GMT; path=/; domain=dotnsf.org";</Script>}
DbDoc.PhysicalUrl(0) & TargetRecordUrl &{">document moved!</a></noframes>}
            Hf.AppendText{<FRAME SRC="http://194.201.124.222/virtual.nsf/Assembled?Open&}&
ContextDoc.Server_Name(0) &{" noresize framespacing=0 frameborder=yes border=0 marginwidth=0
marginheight=0 scrolling=no>}
            Hf.AppendText{<FRAMESET ROWS=35%,*><FRAME SRC="http://} & DbDoc.PhysicalUrl(0) &
{">}
            If TargetUnid<>{}Then Hf.AppendText{"<FRAMESET COLS=35%,*><FRAME SRC="http://} &
DbDoc.PhysicalUrl(0) & TargetDbUrl &{">}
            Hf.AppendText{<FRAME SRC="http://} & DbDoc.PhysicalUrl(0) & TargetRecordUrl &
{"></frameset></frameset></frameset>}
            Hf.AppendText{<!-- Attention: THIS meta page Copyright 1999,2000 by dotNSF, Inc. All
Rights Reserved. -->}
            CachedHtmlDocs.Save False,False,False
        End If
        If(Wru.EngineName(0)={})Then
            Print {[[/} & Db.FilePath & {/0/};CachedHtmlDocs.UniversalId;{]]}
        Else
            Print{Content-Type: text/html}
            Print
            Print CachedHtmlDocs.Txt
        End If
        Exit Sub
Kaput:
    Print {<hr>Oops:},Erl,Err,{<hr>}
    Resume Next
End Sub
Sub Initialize
End Sub
Sub JchSubmitUrl(Url As String,EMail As String)
    JchGetHtml ({add-url.altavista.digital.com/cgi-bin/newurl?ad=1&q=}&url)
    JchGetHtml ({www.lycos.com/cgi-bin/spider_now.pl?query=} & Url & {&email=} & EMail)
    JchGetHtml ({www.hotbot.com/addurl.html?newurl=}& Url & {&email=} & EMail )
End Sub
                    Example code for calling the respective functions is as follows:
'QueryUnidsFromNotesNetToday
Option Public
Option Declare
Use{dotNSF}
Sub Initialize
    REM On Error Resume Next
    Dim Db As New NotesDatabase({},{NotesNet™oday}),Dc As NotesDocumentCollection,Doc As
NotesDocument
    Set Dc=Db.AllDocuments
    Set Doc=Dc.GetFirstDocument
    While Not Doc Is Nothing
        Print Doc.UniversalId&{.}&Db.ReplicaId
        JchgetHtml(Doc.UniversalId&{.}&Db.ReplicaId&{.dotnsf.org/virtual.nsf/go })
        Set Doc=Dc.GetNextDocument(Doc)
    Wend
    Print "END OK!!!"
End Sub
```

The specific embodiments described herein reference use of the present invention regarding specific records and databases using Lotus Notes Storage Facility type format of information. However, it should be recognized that the present invention can be applied for similar purposes on any technology and file structures and databases, for example, Oracle® Database files, etc.

Accordingly, although there have been described preferred embodiments of this novel invention, many variations and modifications are possible without departing from the scope of the invention, and the embodiments described herein are not limited by the specific disclosure above, but rather should be limited only by the scope of the appended claims.

What is claimed is:

1. A method of finding a Uniform Resource Locator (URL) that points to a most updated authoritative source of information contained in database systems, the method comprising:

crawling websites to determine likely publicly available records;

processing the likely publicly available records to determine a unique list of URLs each of which point to information content of crawled web sites that are likely to be the most updated authoritative source of the information content and wherein processing the likely publicly available records comprises applying an algorithm to information content of each crawled website to determine a likelihood of each crawled website as being the most authoritative source for providing specific information content.

2. The method according to claim 1, further comprising: submitting at least an updated portion of the unique list of URLs to an Internet search engine.

3. The method according to claim 2, wherein the Internet search engine provides at least one URL from the submitted unique lists of URLs for a user after a search query.

4. The method according to claim 1, further comprising: registering web entities as authoritative sources for specific information content.

5. The method according to claim 4, further comprising: sending specific information content of a registered web entity to an Internet search engine.

6. The method according to claim 5, wherein the specific information content of the registered web entity is provided to a user after a search query.

7. The method according to claim 1, wherein processing the likely publicly available records includes performing a sanity check to detect information content which may be at least one of politically incorrect content and offensive content to a user.

8. The method according to claim 1, wherein the information contained within the database systems relate to Notes Storage Facility (.NSF) files containing records.

9. The method according to claim 8, wherein the information contained in the Notes Storage Facility records are identified by a ReplicaID and UNiversal ID.

10. A system for obtaining a URL representing an authoritative source of information comprising:
   a web crawler configured to search websites to compile a list content and location of records available for public viewing; and
   a processor configured to apply an algorithm to information content of each searched website to determine a likelihood of each searched website as being a most authoritative source for providing specific information content, the processor further configured to reduce the list of content and location into a unique list of URLs, each of which point to specific information content provided by the most likely authoritative source.

11. The system according to claim 10, further comprising at least one Internet search engine communicating with the processor and configured to provide at least one URL of the unique list of URLs to a user in response to a user search query inquiring about the specific information content.

12. The system according to claim 4 further comprising a memory storing a module configured to parse content of each location and determine a likelihood of the records containing private information.

13. The system according to claim 11, further comprising a memory communicating with the processor, the memory storing a module configured to remove hyped META tags from information submitted to the at least one Internet search engine to avoid problems affecting page positioning for declared contents, as opposed to actual contents, of the information submitted to the at least one Internet search engine.

14. The system according to claim 11, further comprising a memory storing a module configured to verify searched website information is virus free before automatic submission to the at least one Internet search engine.

15. The system according to claim 11, further comprising a memory communicating with the processor, the memory storing a module configured to determine all possible URLs hosted at a searched website using a native system call.

16. The system according to claim 11, further comprising, one of a user terminal or an agent communicating with the at least one Internet search engine, the user terminal operative to accept the user's search query.

17. The system according to claim 11, wherein the information pertains to Notes Storage Facility containers containing information.

18. The system according to claim 17, wherein the information in the Notes Storage Facility containers is uniquely identified by a ReplicaID and a UNIversalID.

19. The system of claim 10, further comprising a memory communicating with the processor, the memory storing a module configured to determine copyrighted content of a searched website that is unlikely to be authorized to republish the copyrighted content.

20. The system according to claim 10, further comprising a memory communicating with the processor, the memory storing a module configured to sanitize dynamic content of a searched website into static content.

21. The system according to claim 10, further comprising a memory communicating with the processor, the memory storing a module configured to deduplicate URLs of searched web sites by eliminating path information of the URLs and reducing each URL into its bare indispensable information to ensure uniqueness.

22. The system according to claim 10, further comprising a memory communicating with the processor, the memory storing a module configured to render URLs of searched websites to be independent of physical location within a server and allow relocation of information within the server for users consulting old addresses.

23. An information directory system accessible worldwide via the Internet, comprising:
   at least one website having a virtual container containing a list of virtualized URLs that are retrievable by an Internet entity, the virtualized URLs previously processed to identify a most likely authoritative source of content specific information stored in data base systems,
   a memory, accessible by the virtual container of the website, wherein the memory stores a virtualized replica of content specific information of at least one website of a register authoritative user, and
   a first module stored in the memory, the module configured to call an algorithm to determine a likelihood of whether a query to the commercial website, looking for specific information content, is likely to be one of a machine or crawler accessing the commercial website, or a human accessing the commercial website.

24. The system according to claim 23, wherein the first module is configured to provide human relevant information which includes a web page with frames pertaining to the specific information content query, if it is determined that the query is likely made by the human.

25. The system according to claim 24, wherein the first module is further configured to provide machine relevant information which includes text of a web page pertaining to the specific information content query, excluding information not necessary for machine processing, if it is determined that the query is likely made by the machine or crawler.

26. The system according to claim 25, wherein the first module is further configured to first provide the machine relevant information and then the human relevant information if it cannot be determined that the likelihood of the query was made by either a machine or human.

27. The system according to claim 26, wherein the machine relevant information is noframe format and wherein the human relevant information is frame format.

28. A method for virtualizing URLs identifying information sources in an Internet comprising:

separating a URL into a combination of DNS and HTTP protocols;

rearranging the DNS and HTTP protocols of the URL; and rewriting the URL as a unique identifier that allows seamless switching between the DNS and HTTP protocols.

* * * * *